April 11, 1961  J. W. ANDERSON  2,978,730
WINDSHIELD WIPER BLADE ASSEMBLY
Filed Aug. 31, 1959  2 Sheets-Sheet 1
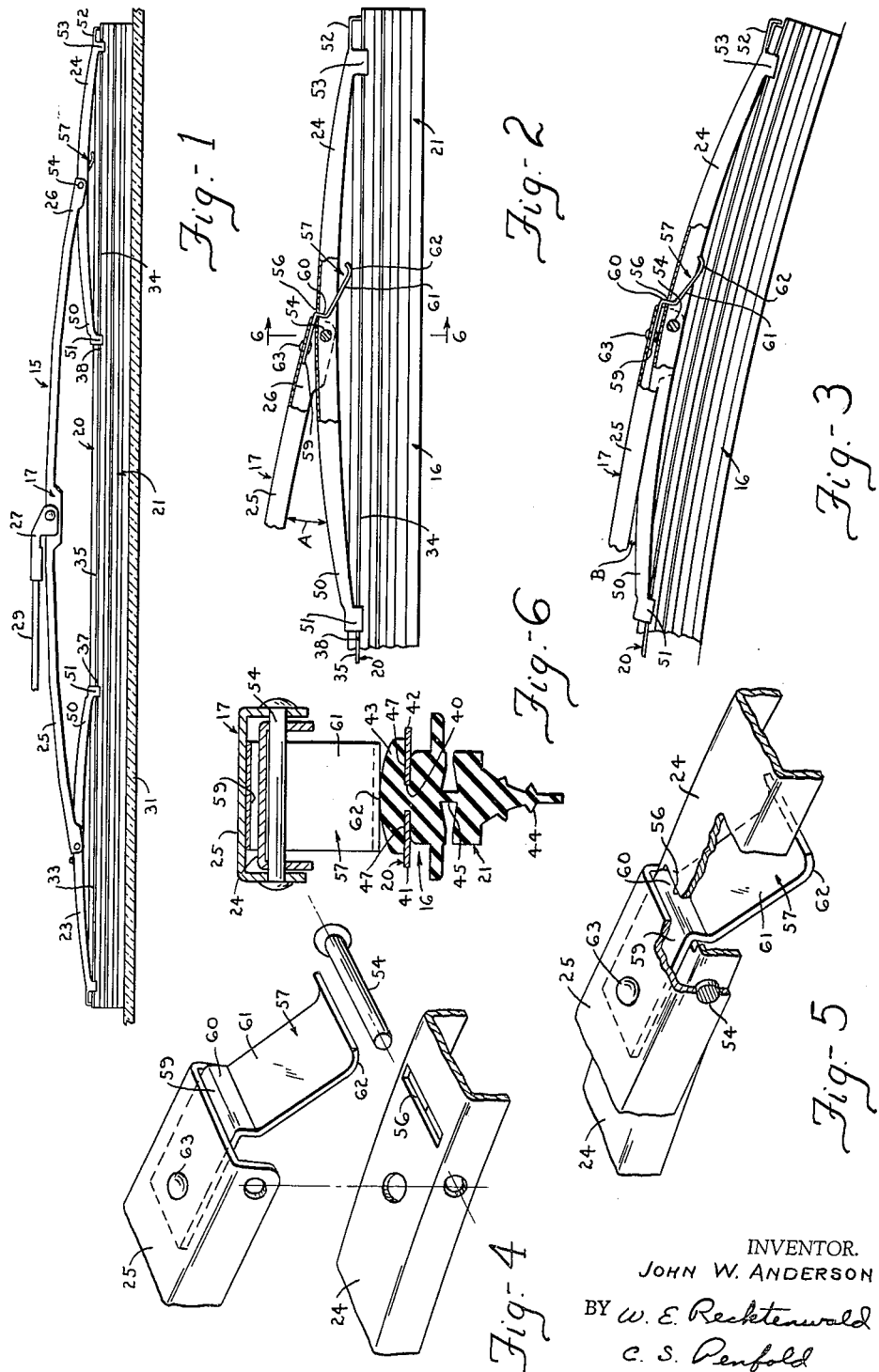
INVENTOR.
JOHN W. ANDERSON
BY W. E. Recktenwald
C. S. Penfold
ATTORNEY April 11, 1961    J. W. ANDERSON    2,978,730
WINDSHIELD WIPER BLADE ASSEMBLY
Filed Aug. 31, 1959    2 Sheets-Sheet 2

INVENTOR.
JOHN W. ANDERSON
BY W. E. Recktenwald
C. S. Penfold
ATTORNEY

United States Patent Office 2,978,730
Patented Apr. 11, 1961

2,978,730

WINDSHIELD WIPER BLADE ASSEMBLY

John W. Anderson, Gary, Ind.

Filed Aug. 31, 1959, Ser. No. 836,853

18 Claims. (Cl. 15—250.42)

This invention relates to windshield wiper blades for automobiles and other vehicles having curved windshields, and relates particularly to apparatus for avoiding departure from effective conformity to the windshield by a portion of the wiper blade as it moves across successive portions of an automobile windshield having varying degrees of curvature.

The windshield wiper assemblies to which this invention relates are generally the type of assemblies that embody a blade comprising a resilient wiping element having a wiping edge for contacting and wiping the glass, such element having an edge spaced from such wiping edge and supported by a resilient flexor or backing strip, all in combination with a pressure receiving and distributing superstructure comprising articulated members designed and disposed to receive arm pressure and apply it at predetermined spaced-apart points on said blade.

Because of the sharper curvature of each of the two outer portions of wrap-around windshields, an outer portion of a wiper blade, when moving across such more sharply curved outer portion of the windshield, must have a minimum of resistance to flexing to enable it to conform to the windshield at such outer portion, effectively enough to produce a full and satisfactory wipe at such outer portion.

However, it has been discovered that when the wiper blade is provided at its outer portion with such minimum resistance to flexing, it assumes a straighter formation as it returns in its stroke to the less abruptly curved portions of the windshield, and in that formation has not enough resistance to flexing away from the windshield to keep it in effective contact with the windshield—with the result that ineffective wiping is encountered at that area of the windshield which is directly in the line of vision of the driver.

The heretofore unsolved problem of providing a wiper that will wipe effectively both at such less abruptly curved portions of the windshield and also at the more sharply curved portions of the windshield (in other words, throughout the entire stroke of the blade) has had a great deal of attention from engineers in the automotive industry. Various devices have been proposed for solving this problem. Some have been patented. None have been completely satisfactory.

One difficulty encountered has had to do with avoiding the introduction of special pivots, springs, levers, etc.— the introduction of which imposes added manufacturing costs and increases the incidence of operational disorders which under certain conditions cause damage to the windshield.

It will be noted that in the preferred form of the instant invention such desired result is accomplished satisfactorily by the mere introduction of a very low-cost, specially formed, single leaf spring, secured adjacent one of its ends to one of said elements and having its outer end portion disposed to apply, toward the windshield, to a longitudinal portion of said blade lying between two such spaced-apart points, at a point on said portion substantially remote from each of said two points, pressure in such manner that its effect is greatest when the angularity between such element and an element with which it articulates is greatest, and becomes progressively less as that angularity becomes less.

This structure automatically meets the requirement for variations in pressure of such specially formed leaf spring according to the position of the blade in its over-all wipe pattern, so that there are produced uniformly satisfactory wiping results throughout the entire stroke of the blade.

Other objects and advantages of the invention will become apparent after the description hereinafter set forth is considered in conjunction with the drawings annexed hereto.

Figure 1 is a side view in elevation of one preferred form of my improved windshield wiper blade assembly as applied to a substantially flat portion of a windshield;

Figure 2 is an enlarged view with parts broken away of the right-hand portion of the full assembly of Figure 1 removed from the windshield;

Figure 3 is an enlarged view similar to Figure 2 with the portion of the blade shown conforming with a curved portion of a windshield;

Figure 4 is an enlarged blown-apart perspective view of certain important parts of my invention;

Figure 5 is an enlarged perspective view, with parts broken away and in section, of the assembled elements of Figure 4;

Figure 6 is a cross-sectional view taken along the lines 6—6 of Figure 2;

Figure 7:
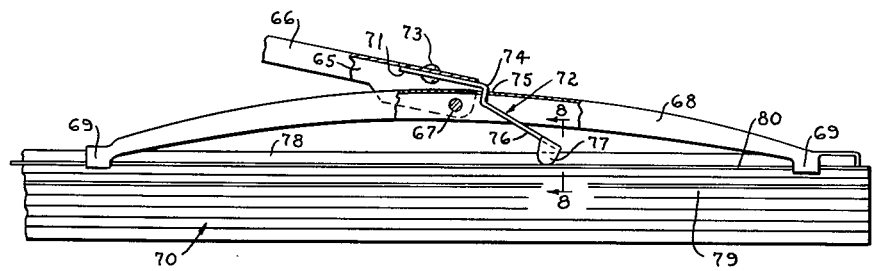
Figure 7 is a partial view of a modified form of blade with parts broken away and shown in section.

Referring to the drawings and particularly to Figures 1 to 6, the windshield wiper assembly is generally designated 15 and is comprised of a wiper blade 16 and a pressure-distributing superstructure 17. The wiper blade 16 is comprised of an elongate freely and resiliently flexible support, backing strip, or flexor 20 and a resilient rubberlike element 21 connected with the flexor. The pressure-distributing superstructure or transmitting device 17 may be constructed in various ways but, as herein illustrated, preferably includes a pair of corresponding secondary yokes 23, 24 having their ends slidably connected with the blade 16, a primary yoke 25 having its ends pivotally connected with intermediate portions of the secondary yokes 23 and 24, and a connector 27 carried by the yoke for connection with a wiper arm 29 which is oscillatably mounted on a pivot shaft of the vehicle to permit movement of the wiper blade across the surface of a windshield 31.

The flexor 20, as illustrated, is elongate and has corresponding end portions 33, 34 and an intermediate portion 35 of greater width than the end portions. This variation in width forms shoulders which provide longitudinally spaced abutment means 37, 38. The flexor 20 is preferably provided with an elongate narrow slot 40 terminating short of the ends of the flexor whereby longitudinal parallel side portions 41, 42 of the flexor can be manipulated so that the resilient element 21 can be properly located therein. Due to the characteristics of the flexor 20, the wiper blade 16 is primarily limited to flexation or movement in a plane substantially perpendicular to a surface to be cleaned and is substantially inflexible in a plane lying transverse thereto.

The wiping element 21 is provided with an attaching portion 43 (Figure 6) and a wiping portion 44, which is joined to the attaching portion by an intermediate restricted portion or web 45 so as to permit tilting of the wiping portion. The attaching portion 43 is provided with a pair of corresponding grooves 47, one being located adjacent each side of the attaching portion in a predetermined position so that they lie substantially in the same plane. The grooves 47 receive the intermarginal edge portions of the slot 40 in the longitudinally extending sides 41, 42 of the flexor 20 for holding said flexor and wiping element 21 assembled.

The secondary yokes 23, 24 are, in this assembly, somewhat similar in certain outward appearances. The inner end of each channel-shaped secondary yoke is formed to provide a transverse arcuate or curved portion 50 and a pair of corresponding ears or claws 51. The outer end of each secondary yoke is provided with a shroudlike end wall 52 which serves to partially conceal the ends of the flexor 20. The outer end of each of the secondary yokes 23, 24 is also provided with a pair of ears or claws 53 (similar to claws 51) spaced inwardly from the end wall 52. When assembled with the blade, the pairs of ears or claws 51, 53 of the yoke 23 extend over the reduced extremity 33 of the flexor 20 and the corresponding ears or claws 51, 53 of the yoke 24 similarly extend over the extremity 34 of the flexor 20 to effect a sliding feature between the yokes and the flexor. The yoke 24 is pivotally fastened to the end of the primary yoke or bridge 25 by means of a pin or rivet 54 passing through aligned apertures formed in the side walls of the yoke 24 and bridge 25. The detached secondary yoke 23 and the pivotally attached secondary yoke 24 and bridge 25 are preferably assembled with the flexor 20 by merely sliding the yokes inwardly of the extremities of the flexor until the inner ends of the yokes engage the abutment means 37, 38 after which the free end of the primary yoke 25 is attached to the secondary yoke 23 in a manner shown and described in my copending application Serial No. 609,631, filed September 13, 1956, now Patent No. 2,955,313.

It is to be understood that the subject invention is not intended to be limited to the above-described pressure-transmitting system or to the particular form of flexor, as various other constructions and arrangements may be employed within the broad teaching or spirit of the invention. These elements are being shown and described for illustration purposes only.

The pressure-transmitting superstructure 17 has its primary yoke or bridge 25 pivotally connected at its outboard end portion 26 to the central portion of the secondary yoke 24 by means of the pin 54. The term "outboard" is intended to mean that portion (26) of the bridge 25, the yoke 24, and the portion of the wiper blade disposed outwardly from the pivot shaft and wiper arm and which is intended to contact and conform to not only the substantially flat central area of the windshield but also the more sharply curved wrap-around areas of the windshield. A transverse slot 56 is formed through the back of the secondary yoke 24 with its long axis lying outboard of and substantially parallel to the axis of the pivot pin 54. Fastened to the outboard end portion 26 of the bridge 25 is an extension member or a specially formed single leaf spring member 57 which, for illustration purposes, is comprised of an attaching portion 59, a downturned portion 60, an angled body portion 61 and a pressure foot portion 62. A rivet 63 passes through the attaching portion 59 for securing the spring member to the bridge 25. It is believed to be obvious that any appropriate form of attaching means such as silver solder or the like could be used in place of the rivet 63 without departing from the invention. The downturned portion 60 of the spring member 57 extends through the slot 56 in the secondary yoke 24 so as to position the angularly disposed body portion 61 and the pressure foot 62 of the member 57 in proper relationship relative to the bridge 25 and secondary yoke 24. In assembling the bridge 25 to the yoke 24, the spring member 57 is threaded through the slot 56 into position with the portion 60 in the slot whereupon the pivot pin 54 is inserted through openings in the coacting sides of the channel-shaped members 24, 25.

With the pressure-transmitting superstructure 17 assembled with the blade 16 the spring member 57, as shown in Figure 2, has its pressure foot 62 bearing on the back of the back portion 43 of the wiper element so as to resiliently urge the portion of the wiper blade, between the claws 51, 53 of the yoke 24, toward the windshield. The amount of pressure exerted by the spring member 57 depends upon the needs and requirements of the particular blade and can be changed at the outset by changing the angle between the plane of the body portion 61 and the plane of the end portion 26 of the bridge 25. As the angular relationship between the overlapping portions of the secondary yoke 24 and the bridge 25 decreases, for instance, from the position defining angle A of Figure 2 on a substantially flat portion of the windshield to the position defining angle B of Figure 3 on a relatively curved portion of the windshield, the amount of pressure exerted by the spring-like member 57 on the back of the wiping element of the blade gradually decreases and, if desired, may be reduced to no pressure at all as the pressure foot 62 is lifted from the back of the wiping element altogether. In the illustrated form, it is contemplated that the spring-like member 57 is to deliver substantially its maximum amount of pressure to the back of the wiping element during the substantially straight-line condition of the wiping element such as is encountered during the wiping of a substantially flat portion of the windshield. The amount of pressure delivered by the spring member 57 to the back of the wiping element is gradually decreased to some minimal amount or to zero as the angular relationship between the yoke 24 and bridge 25 decreases such as is encountered during wiping from a substantially flat portion of a windshield to a substantially curved portion thereof.

From the foregoing, it is believed to be readily apparent that on flat or moderately curved portions of a windshield, the spring member 57 urges the portion of the blade between the pressure points 51, 53 of the yoke 24 into surface-conforming relationship with said windshield. As the curvature of the surface of the windshield under the yoke 24 increases, the angular relationshipe between the overlapping portions of the yoke 24 and the bridge 25 decreases so that the amount of force exerted by the spring member 57 on the portion of the blade between the pressure points 51, 53 decreases, thus permitting the wiper blade under the yoke 24 to more readily conform to the curved surface of the windshield as is particularly true on the wrap-around portions of the so-called wrap-around windshields.

Figure 8:
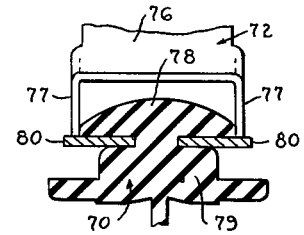
Figure 8 is a cross-sectional view taken along the lines 8—8 of Figure 7.

A modified form of my invention is shown in Figures 7 and 8 wherein an outboard end portion 65 of a bridge member 66 is pivotally fastened by means of a pin 67 to the central portion of a secondary yoke 68 which slidably engages at spaced points 69 with the wiper blade 70 in substantially the same manner as shown and described with respect to Figures 1–6. The attaching end portion 71 of a spring member 72 is fastened to the end portion 65 of the bridge 66 by means of a rivet 73. The member 72 has a downturned portion 74 passing through an elongate slot 75 in the secondary yoke 68 and has a body portion 76 supporting a pair of spaced-apart depending pressure pads or feet 77. The pressure pads 77 straddle the rubber part of the back portion 78 of the wiping element 79 and bear against the upper surfaces of the resiliently flexible backing strip 80.

The just-described modification functions in much the same manner as the form of my invention shown in Figures 1–6, that is, a substantially maximum predetermined amount of pressure is applied to the portion of the wiper blade between the pressure claws 69 of the secondary yoke during the wiping of a flat or moderately curved portion of a windshield with the amount of pressure being applied by said member 72 gradually reducing to or approximating zero as the blade passes from said substantially flat or moderately curved portions to the more sharply curved portions of the windshield. The modification of Figures 7 and 8 have an added advantage in that the pads 77 engage the flexor 80 on the top surfaces near the lateral edges thereof such as to lend a limited amount of stability against torsional deflection and distortion of the blade between the spaced-apart pressure claws 69 of the yoke 68. This is particularly useful where the distance between the pressure claws 69 is extra long or where the backing strip is unusually flexible.

Figure 9:
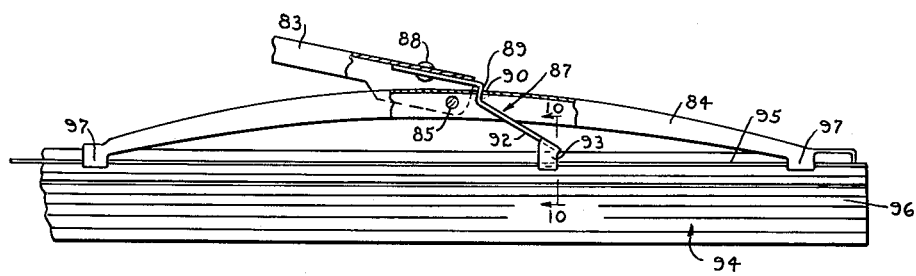
Figure 9 is a partial view of another modified form of blade with parts broken away and shown in section.
Figure 10:
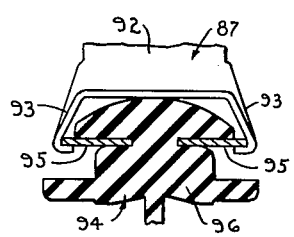
Figure 10 is a cross-sectional view taken along the lines 10—10 of Figure 9.

Figures 9 and 10 illustrate still another modification of my invention wherein a bridge member 83 is pivotally connected to the yoke 84 by means of a pivot pin 85 in much the same manner as described with respect to Figures 1–6. A spring member 87 has an attaching portion secured to said bridge 83 by means of a rivet 88 or the like. A depending portion 89 of said member 87 extends through a slot 90 in the yoke 84 for supporting a body portion 92 and a pair of spaced-apart pressure pads or claws 93 relative to said bridge 83. A wiper blade 94 comprising a flexor member 95 disposed in the side walls of a wiping element 96 is assembled with the yoke 84 and bridge in the manner described above. The claws 93 of the spring member 87 slidingly and embracingly engage the lateral edge of the flexor 95 between and spaced from the pressure claws 97 on the opposite end portions of the yoke 84.

The modification shown in Figures 9 and 10 has the advantage of applying a maximum amount of pressure to the blade when the blade is on a substantially flat surface and gradually reducing the pressure or removing it altogether when the blade is on the more extremely curved surfaces, substantially the same as the modifications of Figures 1–6 and Figures 7–8 and, in addition, provides additional stability to the blade between the spaced-apart pressure claws 97 of the yoke 84 by limiting the distortion, deflection and chatter sometimes found in lengthy unsupported portions of a blade. This modification has the further advantage of being able to be designed, not only to apply pressure to the blade when the blade is wiping the substantially flat and moderately curved portions of the surface of the windshield, but also to apply a lifting force to the blade when the blade encounters extremely curved surfaces of the windshield. That is, the angular relationship between the spring member 87 and the end portion of bridge 83 can be made such that in the substantially straight condition of the blade, as shown in Figure 9 on a substantially flat portion of the windshield, pressure is applied to the blade by the member 87 through claws 93. As the curvature of the windshield becomes greater, the angle between yoke 84 and bridge 83 decreases and the amount of pressure applied to the blade by member 87 gradually decreases until little or no pressure is being applied to the blade. Further decrease in the size of the angle between the yoke 84 and bridge 83 causes the claws 93 on the member 87 to apply a negative force or a lifting force on the portion of the blade between the pressure claws 97 of the yoke 84 so as to pull that portion of the blade into a more curved condition. This has particular use in extreme conditions where it is necessary to assist the blade in curving its outboard portion to conform the blade all the way out to its end for completely wiping the desired pattern on the windshield.

A windshield having successive portions thereof of degrees of curvature varying from substantially flat to moderately curved, to relatively greatly curved, is effectively wiped by the method of the instant invention. That is, an articulated multipart pressure-transmitting superstructure is operatively connected to a blade at spaced-apart points and has resilient means engaging with said blade with an amount of pressure designed to urge the blade into conformity with a moderately curved portion or a substantially flat portion of the windshield. The resilient means is so constructed and arranged that as the blade moves across successively greater curved portions of the windshield, less and less pressure is applied to the blade so that the flexibility of the blade permits the blade to conform to the more sharply curved portions of the windshield. The pressure exerted by said resilient means on the portion of the blade is varied by the change in angular relationship between two articulated parts of the multipart pressure-transmitting superstructure. As the portion of the blade moves over the more curved portions of the windshield the angular disposition of the pivoted or articulated parts of the multipart pressure-transmitting superstructure is reduced, which thereby reduces the relative urging force of the resilient means against the portion of the blade lying between two adjoining spaced pressure points. The reduced amount of urging force applied by the resilient means to the blade permits the flexible wiping blade to conform to the greater curvatures of the windshield.

Having thus described my invention, it is obvious that various modifications may be made in the same without departing from the spirit of the invention, and, therefore, I do not wish to be understood as limiting myself to the exact forms, constructions, arrangements and combinations of parts herein shown and described.

I claim:

1. In a windshield wiper blade assembly: a resilient wiping member adapted to conform to a surface to be wiped, an articulated multipart assembly adapted to receive pressure from a windshield wiper arm and to apply such pressure at predetermined spaced-apart points on said wiping member, said multipart assembly having at least two elements so articulated that the angularity of their postures with relation to each other varies with variations in the degree of curvature of the windshield lying thereunder, and means activated by one of said elements and operatively engaging said wiping member at a position between the extremities of said other element, whereby to vary the degree of the pressure of such means at said position according to variations in the angularity of the relative postures of said two elements.

2. In a windshield wiper blade assembly: a resilient wiping member adapted to conform to a surface to be wiped, an articulated multipart assembly adapted to receive pressure from a windshield wiper arm and to apply such pressure at predetermined spaced-apart points on said wiping member, said multipart assembly having at least two elements so articulated that the angularity of their positions with relation to each other varies with variations in the degree of curvature of the windshield lying thereunder, and means carried by one of said elements and having a portion adapted to apply pressure to a portion of said wiping member between the extremities of said other element, whereby the degree of pressure applied by said means to said wiping member is varied according to variations in the angularity of the relative positions of said two elements.

3. In a windshield wiper blade assembly: a resilient wiping means adapted to conform to a surface to be wiped, an articulated multipart assembly adapted to receive pressure from a windshield wiper arm and to apply such pressure at predetermined spaced apart points on said wiping member, said multipart assembly having at least one bridge member and one yoke member so articulated that the magnitude of the angle included between their overlapping portions varies with variations in the degree of curvature of the windshield lying thereunder, means for operatively connecting one end of said bridge member and said yoke member to said wiping means at said spaced-apart points, and resilient means carried by and movable with one of said two members and having a portion adapted to contact and apply pressure to said wiping means between two adjacent ones of said spaced-apart points of the other member, said resilient means coacting with said one of said two members to vary the amount of pressure applied by said resilient means according to variations in the magnitude of the angle included between the overlapping portions of said two members of the multipart assembly.

4. In a windshield wiper blade assembly: a resilient wiping means adapted to conform to a surface to be wiped, an articulated multipart assembly adapted to receive pressure from a windshield wiper arm and to apply such pressure at predetermined spaced-apart points on said wiping means, said multipart assembly having at least one bridge member and one yoke member so articulated that the magnitude of the angle between the overlapping portion of one with relation to the other varies with variations in the degree of curvature of the windshield lying thereunder, one end of said bridge member and said yoke member being operatively connected with said wiping means for applying said pressure at said spaced-apart points, and means carried by said bridge member and having a portion adapted to contact and apply pressure to said wiping means at a position between two adjacent spaced-apart points of said yoke member and substantially remote from each point thereof.

5. A windshield wiper comprising an elongate flexible body having a wiping edge, a flexible backing therefor to facilitate the conformance of the wiping edge to the surface being wiped, pressure-transmitting means comprising one member extending lengthwise of the body, a second member extending lengthwise of the body beneath one end of the first member and pivotally connected thereto, the opposite ends of the second member being connected to the backing at longitudinally spaced points, resilient means carried by said first member in engaging relation with the flexible body at a point intermediate the longitudinally spaced points of said second member, the amount of pressure transmitted by said last-named means to said flexible body decreasing as the angle between the first and second members decreases, and means for operatively connecting the other end of said first member to said backing.

6. In a windshield wiper assembly, a flexible wiper blade comprising an elongate wiping element supported by elongate flexible backing means, pressure-transmitting means operatively connected with said blade at longitudinally spaced-apart points, said pressure-transmitting means comprising a bridge member pivotally connected at at least one end to a yoke member, and means carried by said one end of said bridge member and extending into operative engagement with said blade for applying pressure to said blade at least during a portion of the flexing of said blade on a windshield.

7. In a windshield wiper assembly, a flexible wiper blade comprising an elongate wiping element supported by elongate flexible backing means normally flexible only in a plane substantially perpendicular to a windshield, a bridge member and at least one yoke member operatively connected with said blade at longitudinally spaced-apart points, means pivotally connecting one end of said bridge member to said yoke member, and means carried by said bridge member and extending through a slot in said yoke member into operative engagement with said blade for applying varying degrees of pressure to said blade as the blade sweeps across a windshield surface of varying degrees of curvature.

8. In a windshield wiper assembly, a flexible wiper blade comprising an elongate wiping element supported by elongate flexible backing means, said backing means being normally flexible only in a plane substantially perpendicular to a windshield and being relatively inflexible in a plane transverse thereto, pressure-transmitting means operatively connected with said blade at longitudinally spaced-apart points, said pressure-transmitting means having a bridge member and at least one yoke member, pivot means connecting one end of said bridge member to an intermediate portion of said yoke member for pivotal movement of said bridge and said yoke in a plane containing the longitudinal axes of said bridge and said yoke, and means carried by said one end of said bridge member and extending through a slot in said yoke member into operative engagement with said blade, said last-named means engaging said blade with the greatest amount of pressure when the angle between the bridge member and the yoke member is the largest, said amount of pressure decreasing as the angle between the bridge member and the yoke member decreases whereby the blade readily conforms to the surface of the windshield.

9. A windshield wiper comprising an elongate flexible body having a wiping edge, a flexible backing therefor to facilitate the conformance of the wiping edge to the surface being wiped, a primary yoke extending lengthwise of the body, a secondary yoke extending lengthwise of the body beneath one end of the primary yoke and pivotally connected thereto, the opposite ends of the secondary yoke being connected to the backing at longitudinally spaced points, means carried by said primary yoke in engaging relation with the flexible body at a point intermediate the logitudinally spaced points of said secondary yoke, the amount of pressure transmitted by said last-named means to said flexible body decreasing as the angle between the primary yoke and secondary yoke decreases, and means for operatively connecting the other end of said primary yoke to said backing.

10. A windshield wiper comprising an elongate flexible body having a wiping edge, a flexible backing therefor to facilitate the conformance of the wiping edge to the surface being wiped, a pressure-transmitting superstructure comprising bridge means extending lengthwise of the body and having one end operatively connected with said backing, secondary yoke means extending lengthwise of the body beneath the other end of the bridge means and being pivotally connected thereto, said secondary yoke means being connected to the backing at longitudinally spaced points, and flexible means rigidly connected to said bridge means and having one end portion extending into engaging relation with the flexible body at a point intermediate the longitudinally spaced points of said secondary yoke means, said flexible means transmitting different amounts of pressure to said flexible body as the angular relationship between the bridge means and secondary yoke means vary.

11. A windshield wiper comprising a resilient wiping element, a primary yoke adapted to receive pressure from a wiper arm, a secondary yoke pivotally connected to one end of said primary yoke for angular movement relative thereto in a plane common to the longitudinal axes of said yokes, said secondary yoke slidably engaging with said wiping element at longitudinally spaced-apart points, means rigidly connected to said one end of said primary yoke and extending into operative pressure-applying contact with said wiping element between said longitudinally spaced apart points, said means varying the amount of pressure applied to said wiping element as the angular relationship between the primary and secondary yokes varies, and means for operatively connecting the other end of said primary yoke to said wiping element.

12. A windshield wiper comprising a resilient wiper element, a primary yoke adapted to receive pressure from a wiper arm, a secondary yoke pivotally connected to one end of said primary yoke for angular movement relative thereto in a plane common to the longitudinal axes of said yokes, said secondary yoke slidably engaging with said wiper element at longitudinally spaced-apart points, resilient means rigidly connected at one end portion to said one end of said primary yoke, the other end portion of said resilient means extending into position for contacting said wiper element between said longitudinally spaced-apart points during at least a portion of the angular movement between said yokes, said means varying the amount of pressure applied to said wiper element as the angular relationship between the primary and secondary yokes varies, and means for operatively connecting the other end of said primary yoke to said wiping element.

13. A windshield wiper comprising a resilient wiper blade assembly, a secondary yoke telescopically receiving one end portion of said blade assembly, a primary yoke having one end pivotally attached to a central part of said secondary yoke and having another end operatively connected with said blade assembly, and means fastened on said one end of said primary yoke and operatively extending into pressure-applying contact with said wiper blade assembly at a point intermediate the spaced ends of said secondary yoke, the amount of pressure applied by said means to said wiper blade assembly varying as the angle between said secondary yoke and said pirmary yoke varies.

14. A windshield wiper comprising a resilient wiper blade assembly, a secondary yoke telescopically receiving one end of said blade assembly, a primary yoke having one end pivotally attached to a central portion of said secondary yoke and having another end operatively connected with said blade assembly, and extension means carried by said one end of said primary yoke and operatively engaging with said wiper blade assembly intermediate the spaced ends of said secondary yoke, said extension means applying pressure to said intermediate part of the wiper blade assembly during the substantially straight-line condition of the blade.

15. In a windshield wiper blade and in combination, a resilient wiping element, a first pressure-transmitting member having one end portion operatively connected with said wiping element, a second pressure-transmitting member pivotally connected with the other end portion of said first member and being slidably connected with said wiping element at longitudinally spaced-apart points, and means carried by said other end portion of said first member and extending into engaging relation with said wiper element at a point intermediate said spaced-apart points during at least a portion of the pivotal movement between said first and second members.

16. In a wiper blade assembly for wiping a curved windshield and in combination, a resilient wiping element, a pressure-transmitting superstructure comprising a first member having one end portion operatively connected with said wiping element, a second member pivotally connected with the other end portion of said first member and being slidably connected with said wiping element at longitudinally spaced-apart points, and means carried by said first member and extending into engaging relation with said wiping element at a point intermediate said spaced-apart points of said second member during at least a portion of the pivotal movement between said first and second members for urging said wiping element toward the windshield.

17. In a wiper blade assembly for wiping a curved windshield and in combination, a resilient wiping element, a pressure-transmitting superstructure comprising a bridge member having one end portion operatively connected with said wiping element, a yoke member pivotally connected with the other end portion of said bridge member and being slidably connected with said wiping element at longitudinally spaced-apart points, and means activated by said bridge member and opertaively engaging said blade at a point between the extremities of said secondary yoke, whereby to facilitate the flexing of such blade between said extremities as the angularity of the position of said principal yoke, with relation to said secondary yoke, changes to accommodate variations in windshield curvature.

18. In a windshield wiper blade assembly a resilient wiping member adapted to conform to a surface to be wiped, an articulated multipart assembly adapted to receive pressure from a windshield wiper arm and to apply such pressure at predetermined spaced-apart points on said wiping member, said multipart assembly having at least two elements so articulated that the angularity of their postures with relation to each other varies with variations in the degree of curvature of the windshield lying thereunder, and resiliently reactive means activated by one of said elements and operatively engaging said wiping member at a position between the extremities of said other element, whereby to permit the wiping member to conform automatically to infinite variations in the curvature of the surface being wiped.

References Cited in the file of this patent

UNITED STATES PATENTS

| | | |
|---|---|---|
| 2,254,343 | Zierer | Sept. 2, 1941 |
| 2,537,411 | Klingler | Jan. 9, 1951 |
| 2,706,291 | Rappl | Apr. 12, 1955 |
| 2,739,337 | O'Shei | Mar. 27, 1956 |
| 2,800,676 | Makela et al. | July 30, 1957 |
| 2,897,529 | Krohm | Aug. 4, 1959 |

UNITED STATES PATENT OFFICE
CERTIFICATE OF CORRECTION

Patent No. 2,978,730                                April 11, 1961

John W. Anderson

It is hereby certified that error appears in the above numbered patent requiring correction and that the said Letters Patent should read as corrected below.

Column 4, lines 23 and 28, for "spring-like", each occurrence, read -- spring --; lines 46 and 47, for "relationshipe" read -- relationship --; column 5, line 30, for "edge" read -- edges --; column 6, line 14, for "windshield the" read -- windshield, the --; line 64, for "spaced apart" read -- spaced-apart --; column 8, line 58, for "spaced apart" read -- spaced-apart --; column 10, line 17, for "opertaively" read -- operatively --.

Signed and sealed this 21st day of November 1961.

(SEAL)
Attest:

ERNEST W. SWIDER                               DAVID L. LADD
Attesting Officer                                   Commissioner of Patents